(12) United States Patent
Eckermann

(10) Patent No.: US 8,397,006 B2
(45) Date of Patent: Mar. 12, 2013

(54) ARBITRATION SCHEME FOR ACCESSING A SHARED RESOURCE

(75) Inventor: Benjamin C. Eckermann, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 434 days.

(21) Appl. No.: 12/695,469

(22) Filed: Jan. 28, 2010

(65) Prior Publication Data

US 2011/0185095 A1 Jul. 28, 2011

(51) Int. Cl.
*G06F 13/36* (2006.01)

(52) U.S. Cl. ......... 710/117; 710/241; 370/321; 345/535

(58) Field of Classification Search .................. 710/41, 710/45, 117, 120, 125, 240, 241, 243; 345/501, 345/531, 534, 535; 370/321, 442
See application file for complete search history.

(56) References Cited

U.S. PATENT DOCUMENTS

| | | | | |
|---|---|---|---|---|
| 5,241,632 A * | 8/1993 | O'Connell et al. | ............ | 710/117 |
| 5,438,666 A | 8/1995 | Craft et al. | | |
| 5,678,009 A * | 10/1997 | Bains et al. | .................... | 710/125 |
| 5,805,905 A * | 9/1998 | Biswas et al. | ................. | 710/244 |
| 5,815,167 A * | 9/1998 | Muthal et al. | ................. | 345/541 |
| 5,818,464 A * | 10/1998 | Wade | ............................ | 345/501 |
| 5,845,097 A * | 12/1998 | Kang et al. | .................... | 710/117 |
| 6,032,232 A | 2/2000 | Lindeborg et al. | | |
| 6,035,360 A | 3/2000 | Doidge et al. | | |
| 6,138,197 A * | 10/2000 | Cheng | ............................ | 710/117 |
| 6,222,564 B1 * | 4/2001 | Sturges | .......................... | 345/531 |
| 6,300,792 B1 | 10/2001 | Pedersen | | |
| 6,519,666 B1 * | 2/2003 | Azevedo et al. | .............. | 710/120 |
| 6,998,871 B2 | 2/2006 | Mulligan | | |
| 7,340,542 B2 | 3/2008 | Moyer et al. | | |
| 7,414,426 B2 | 8/2008 | Cox et al. | | |
| 7,538,772 B1 * | 5/2009 | Fouladi et al. | ................ | 345/535 |
| 7,688,775 B2 * | 3/2010 | Ramkumar et al. | ......... | 370/321 |
| 8,106,915 B2 * | 1/2012 | Kawano et al. | ............... | 345/535 |
| 2010/0070667 A1 * | 3/2010 | Mittal | ........................... | 710/117 |

FOREIGN PATENT DOCUMENTS

EP 0691616 A1 1/1986

OTHER PUBLICATIONS

Schonberg, Sebastian. Using PCI-Bus Systems in Real-Time Environments. Dissertation. Jun. 2002.*
Dao et al. 7 Series FPGAs AXI Multi-Port Memory Controller Using the PlanAhead Tool. Application Note. Apr. 24, 2012.*
Intel Corporation. Intel 855GM/855GME Chipset Graphics and Memory Controller Hub (GMCH). Datasheet. Apr. 2005.*

* cited by examiner

*Primary Examiner* — Matthew D Spittle
(74) *Attorney, Agent, or Firm* — Joanna G. Chiu; James L. Clingan, Jr.

(57) ABSTRACT

A processing system includes a shared resource, an arbitration module, and a requesting device for issuing requests to the arbitration module to access the shared resource to perform transactions on the shared resource. The arbitration module grants access to the requesting device for a fixed time duration. The fixed time duration comprises one of a plurality of time durations including a first and a second time duration; the second longer than the first. The requesting device prioritizes performance of the transactions on the shared resource based upon the fixed time duration and types of transactions to be performed. Transaction type comprises one of a plurality of types including a first type that requires a time duration that can be performed within the first time duration and a second type that requires a time duration that exceeds the first time duration but can be performed within the second time duration.

20 Claims, 3 Drawing Sheets

ARBITRATION SCHEME FOR ACCESSING A SHARED RESOURCE

BACKGROUND

1. Field

This disclosure relates generally to arbitration, and more specifically, to an arbitration scheme for accessing a shared resource.

2. Related Art

In data processing systems today, it is common for multiple devices to require access to a shared resource. In order for each of the multiple devices to be able to access the shared resource, an arbitration scheme needs to be used to allow each device to access the shared resource in an appropriate manner. However, each of the multiple devices may perform one or more different transaction types which may further complicate arbitration. For example, a device may have hard real-time deadlines to meet and other devices may issue transactions having varying time requirements. Therefore, a need exists for an improved arbitration scheme which takes into consideration different transaction types.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
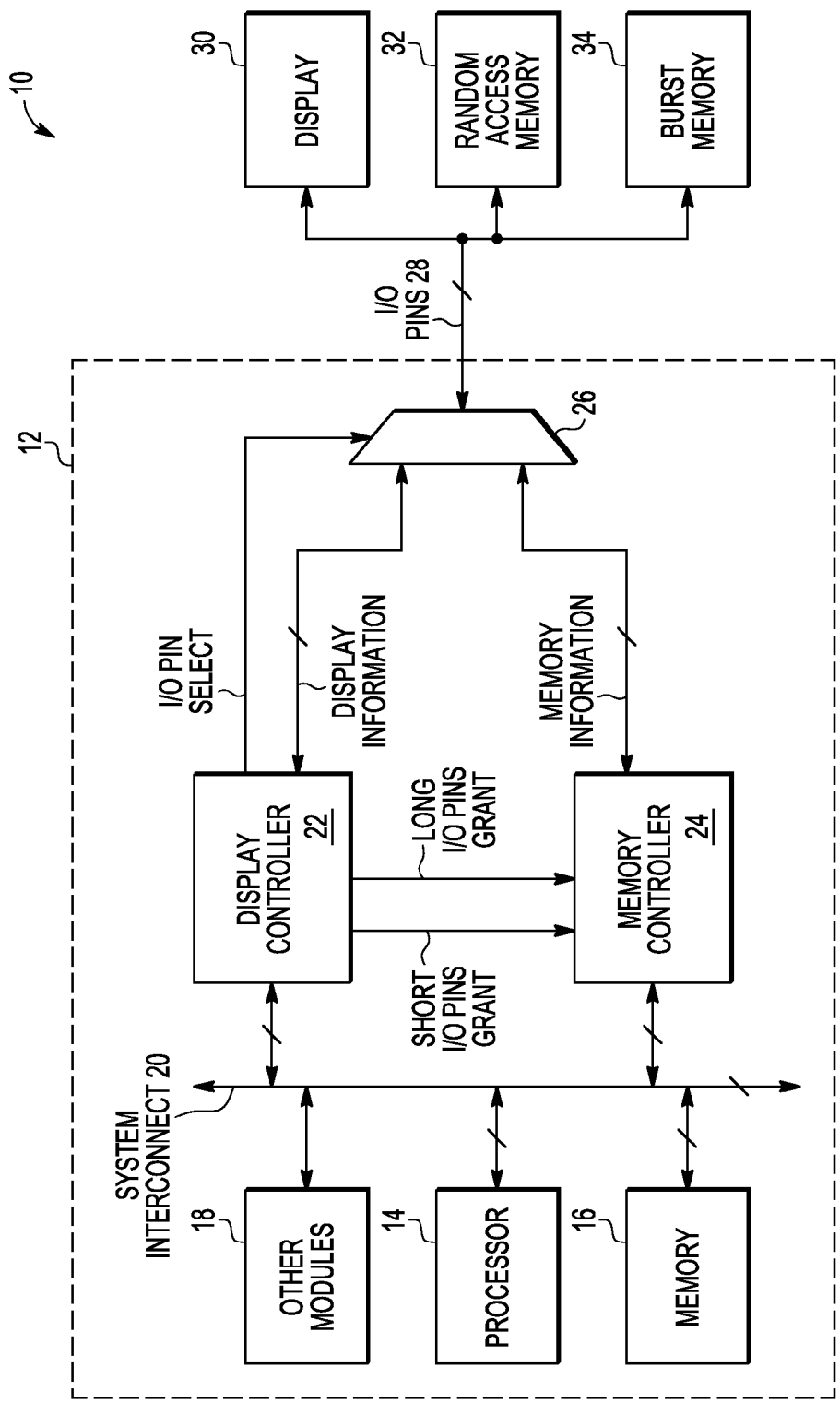
FIG. 1 illustrates, in block diagram form, a system in accordance with one embodiment of the present invention.

In one embodiment, a device which requires access to a shared resource may improve its utilization of the shared resource through the use of time duration information provided with a grant to use the shared resource. For example, in the case of a device which needs to issue two or more different types of transactions to a shared resource, such as transactions with differing access times, the device may use the time duration information provided with the grant to determine how to prioritize between the different types of transactions. For example, in one embodiment, both a short grant signal and a long grant signal are received by the device such that when the short grant signal is asserted, the device knows it will have a shorter period of time to use the shared resource as compared to when the long grant signal is asserted. In one embodiment, if neither grant signal is asserted, the device cannot use the shared resource, and, in one embodiment, any pending transaction of the device which remain when no grant is present is cancelled without completion.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

FIG. 1 illustrates a system 10 in accordance with one embodiment of the present invention. System 10 includes an integrated circuit 12, a display 30, a random access memory (RAM) 32, and a burst memory (34). Integrated circuit (IC) 12 is coupled to each of display 30, RAM 32, and burst memory 34 via input/output (I/O) pins 28 which, in one embodiment, allow communication between IC 12 and elements external to IC 12. IC 12 includes a system interconnect 20, a processor 14, a memory 16, one or more other modules 18, a display controller 22, a memory controller 24, and multiplexing circuitry 26. In the illustrated embodiment, each of other modules 18, processor 14, memory 16, display controller 22, and memory controller 24 are bidirectionally coupled to system interconnect 20 and are able to communicate with each other via system interconnect 20. In one embodiment, system interconnect 20 is implemented as a bus, and alternatively, it is implemented as another type of interconnect circuitry, such as, for example, a crossbar switch which allows master and slave devices to communicate with each other. Display controller 22 provides a short I/O pins grant signal and a long I/O pins grant signal (also referred to as a short grant signal and a long grant signal, respectively) to memory controller 24. Display controller 22 also provides an I/O pins select signal to a control input of multiplexing circuitry 26 and communicates display information (which may include, for example, display data needed by display 30) to a first data terminal of multiplexing circuitry 26. Memory controller 24 is coupled to a second data terminal of multiplexing circuitry 26 to communicate memory information with RAM 32 and burst memory 34. This memory information may include, for example, address, data, and control signals. A third data terminal of multiplexing circuitry 26 is coupled to I/O pins 28. Therefore, based on the I/O pin select signal, multiplexing circuitry 26 either allows display controller 22 to communicate with I/O pins 28 (to, for example, communicate the display information with display 30) or memory controller 24 to communicate with I/O pins 28 (to, for example, communicate memory information with RAM 32 or burst memory 34).

In alternate embodiments, note that additional circuit elements may be included within system 10. For example, additional modules may be coupled to system interconnect 20 and/or additional modules may be coupled to I/O pins 28. For example, one or more memories in addition to or in place of RAM 32 and burst memory 34 may be present. Furthermore, additional controllers may be present which can communicate via multiplexing circuitry 26 with I/O pins 28. Therefore, note that I/O pins 28 may be considered a shared resource that is shared among a plurality of requesting devices, which are requesting use of I/O pins 28 (such as display controller 22 and memory controller 24). Also, other types of requesting devices may be coupled to multiplexing circuitry 26 to access I/O pins 28 in place of or in addition to display controller 22 and memory controller 24. For example, any type of controller needing to share access of I/O pins 28 may be present, such as, for example, one or more memory controllers, a bus controller (such as a PCI bus controller), any type of I/O controller, etc. Also, note that in the illustrated embodiment, display 30, RAM 32, and burst memory 34 are not located on IC 12. However, in alternate embodiments, one or more of the modules coupled to I/O pins 28 may be located on a same IC as IC 12.

In operation, a first requesting device, such as display controller 22, and a second requesting device, such as memory controller 24, access a shared resource, such as I/O pins 28. In one embodiment, the second requesting device receives both a short I/O pins grant signal and a long I/O pins grant signal, and based on which grant signal is asserted, issues either a short transaction or a long transaction for the shared resource. For example, in one embodiment, RAM 32 require a shorter time duration for completing a transaction while burst memory 34 requires a longer time duration for completing a transaction. In one embodiment, RAM 32 may be a static RAM (SRAM) or a NOR flash memory, while burst memory 34 may be a NAND flash memory. Therefore, memory controller 24, when granted access to I/O pins 28 to communicate with RAM 32 or burst memory 34, may prioritize between the transactions it needs to issue based on whether the granted access is a short grant or a long grant. In one embodiment, each of the short grant or a long grant is a grant to the shared resource provided for a fixed amount of time (i.e. for a fixed time duration), where at the expiration of that fixed amount of time, any pending transaction is cancelled. In one embodiment, a long grant grants access to the shared resource (e.g. I/O pins 28) for a fixed time duration that is greater than a fixed time duration granted by a short grant and is at least as long as the time needed to complete the longest transaction possible by memory controller 24 (which may be a burst transaction with burst memory 34). In one embodiment, a short grant grants access to the shared resource (e.g. I/O pins 28) for a fixed time duration that is shorter than the fixed time duration granted by a long grant and not long enough to complete the longest transaction by memory controller 24. For example, the short grant may grant access to I/O pins 28 long enough to complete transactions to RAM 32 but not long enough to complete any transactions to burst memory 34. In one embodiment, a short grant may grant access to a shared resource for a fixed time duration in the range of approximately 1 to 10 microseconds and a long grant may grant access to a shared resource for a fixed time duration greater than approximately one millisecond.

In the illustrated embodiment, display controller 22 is a real-time controller which has real-time deadlines it has to meet in accessing display 30. Therefore, only when display controller 22 is idle does it grant access to I/O pins 28 to memory controller 24. Therefore, in this embodiment, display controller 22 provides the short I/O pins grant signal and the long I/O pins grant signal to memory controller 24. For example, in one embodiment, display controller 22 may be a Liquid Crystal Display (LCD) controller (or LCD driver) which knows about how long it will be idle based on the operation it is performing and can provide a short grant signal or long grant signal accordingly. That is, display controller 22 can provide a short or long grant signal based on the time between transactions it performs on the shared resource. Therefore, in one embodiment, the first requesting device provides the short grant signal and the long grant signal to the second requesting device. For example, in the illustrated embodiment, the first requesting device (e.g. display controller 22) can also control multiplexing circuitry 26 to determine which terminal of multiplexing circuitry 26 is coupled to I/O pins 28. When display controller 22 is accessing display 30, display controller 22 may set the I/O pin select signal to a first value to allow multiplexing circuitry 26 to provide the display information to display 30, and when display controller 22 is idle or when it asserts either one of the short or long grant signals, it may set the I/O pin select signal to a second value to allow multiplexing circuitry 26 to communicate the memory information with either RAM 32 or burst memory 34. Therefore, in one embodiment, display controller 22 may also operate as an arbitration module which grants access to another requesting device or master (such as memory controller 24) to the shared resource.

Figure 2:
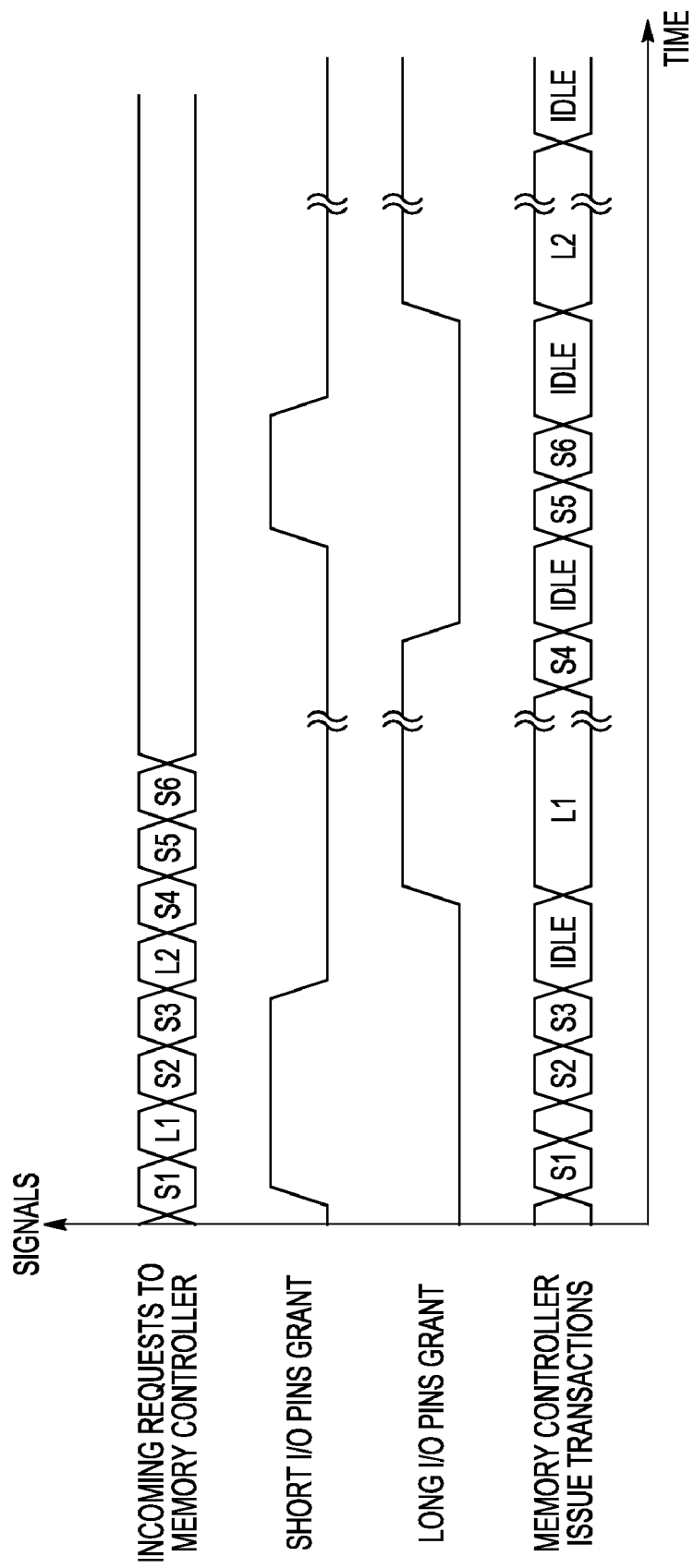
FIG. 2 illustrates, in timing diagram form, operation of a portion of the system of FIG. 1 in accordance with one embodiment of the present invention.

Use of the long and short grant signals by memory controller 24 (or the second requesting device) can further be understood in reference to the timing diagram of FIG. 2. In FIG. 2, short transactions, or transactions which require a time duration no greater than the minimum time duration of the grant of I/O pins 28 granted by assertion of the short grant signal, are represented by "S" followed by a number, where the number simply distinguishes between different transactions. Long transactions, or transactions which require a time duration that is no greater than the maximum time duration of the grant of I/O pins 28 granted by assertion of the long grant signal (and is also longer than the maximum time duration of the grant of I/O pins 28 granted by assertion of the short grant signal), are represented by "L" followed by a number, where the number simply distinguishes between different transactions. In one embodiment, short and long transactions represent different types of transactions. For example, in one embodiment, short transactions are those performed with RAM 32 (e.g. random accesses to RAM 32) and long transactions are those performed with burst memory 34 (e.g. burst accesses to burst memory 34). In one embodiment, a short transaction is a type of transaction that requires a time duration that can be performed within a first fixed time duration (provided, for example, by a short grant) and a long transaction is a type of transaction that requires a time duration that exceeds the first fixed time duration but can be performed within a second fixed time duration (which is longer that the first fixed time duration and provided, for example, by a long grant).

The first row of the timing diagram of FIG. 2 represents incoming requests to memory controller 24. For example, these incoming requests for access to RAM 32 or burst memory 34 can be received by memory controller 24 via system interconnect 20 from processor 14 or from other modules 18, as known in the art. In the example of FIG. 2, the requests are received in the following order: S1, L1, S2, S3, L2, S4, S5, and S6. The second row of the timing diagram of FIG. 2 illustrates the state of the short I/O pins grant signal and the third row of the timing diagram of FIG. 2 illustrates the state of the long I/O pins grant signal. The fourth row of the timing diagram of FIG. 2 illustrates the order and timing of the transactions issued by memory controller 24 from the received requests based on the states of the short and long grant signals. For example, initially, the short I/O pins grant is asserted. Therefore, memory controller 24 issues transactions S1, S2, and S3 before the short I/O pins grant signal is deasserted. At this point, since both the short and long grant signals are deasserted, memory controller 24 is idle and does not have access to the shared resource (to I/O pins 28) at all. Note that during the time the short I/O pins grant signal was asserted, memory controller 24 issued transactions out of order from the way they were received. That is, because memory controller 24 knew that it was only going to be granted access to I/O pins 28 for a short duration of time (due to the short grant signal being asserted rather than the long grant signal to grant access to I/O pins 28), memory controller 24 does not issue any long transactions, such as L1 which was received between S1 and S2. If memory controller 24 had issued L1 during this grant period, since it was a short grant period, it would not have had sufficient time to complete and would have been cancelled. In this case, memory controller 24 would then later have to reissue L1, resulting in longer latencies.

Still referring to FIG. 2, at some time after the short I/O pins grant signal is deasserted, the long I/O pins grant signal is asserted, again granting access to memory controller 24 to access I/O pins 28. However, since it is the long grant signal which is asserted, memory controller 24 can issue a long transaction since it is known that the duration of the current grant will be long enough to accommodate at least one long transaction. Therefore, as shown in FIG. 2, in response to assertion of the long grant signal, memory controller 24 issues transaction L1. Upon completion of a long transaction, in one embodiment, memory controller 24 goes back to issuing short transactions, and thus, as illustrated in FIG. 2, issues S4. However, in an alternate embodiment, memory controller 24 may attempt to issue another long transaction instead. Referring back to the example of FIG. 2, if memory controller 24 still has access to I/O pins 28, it could continue to issue short transactions. However, the long grant signal is deasserted and memory controller 24 again becomes idle. The next time the short grant signal is asserted, memory controller 24 issues S5 and S6, and the next time the long grant signal is asserted, memory controller 24 issues L2. Therefore, note that the long transactions can be taken out of order based on occurrences of the long grant periods. In this manner, a requesting device can prioritize its transactions based on the type of transaction and the amount of time that will be available for a particular grant period.

Therefore, in one embodiment, upon assertion of the short grant signal, memory controller 24 can prioritize short transactions for issuing, and, upon assertion of the long grant signal, memory controller 24 can prioritize long transactions for issuing. In the case of assertion of the long grant signal, memory controller 24 may issue just one long transaction followed by short transactions, or may continuously prioritize the long transactions during the assertions of the long grant signal. Also, in one embodiment, in the case of assertion of the long grant signal, transactions may simply be processed in order, regardless of whether they are short or long type transactions.

Figure 3:
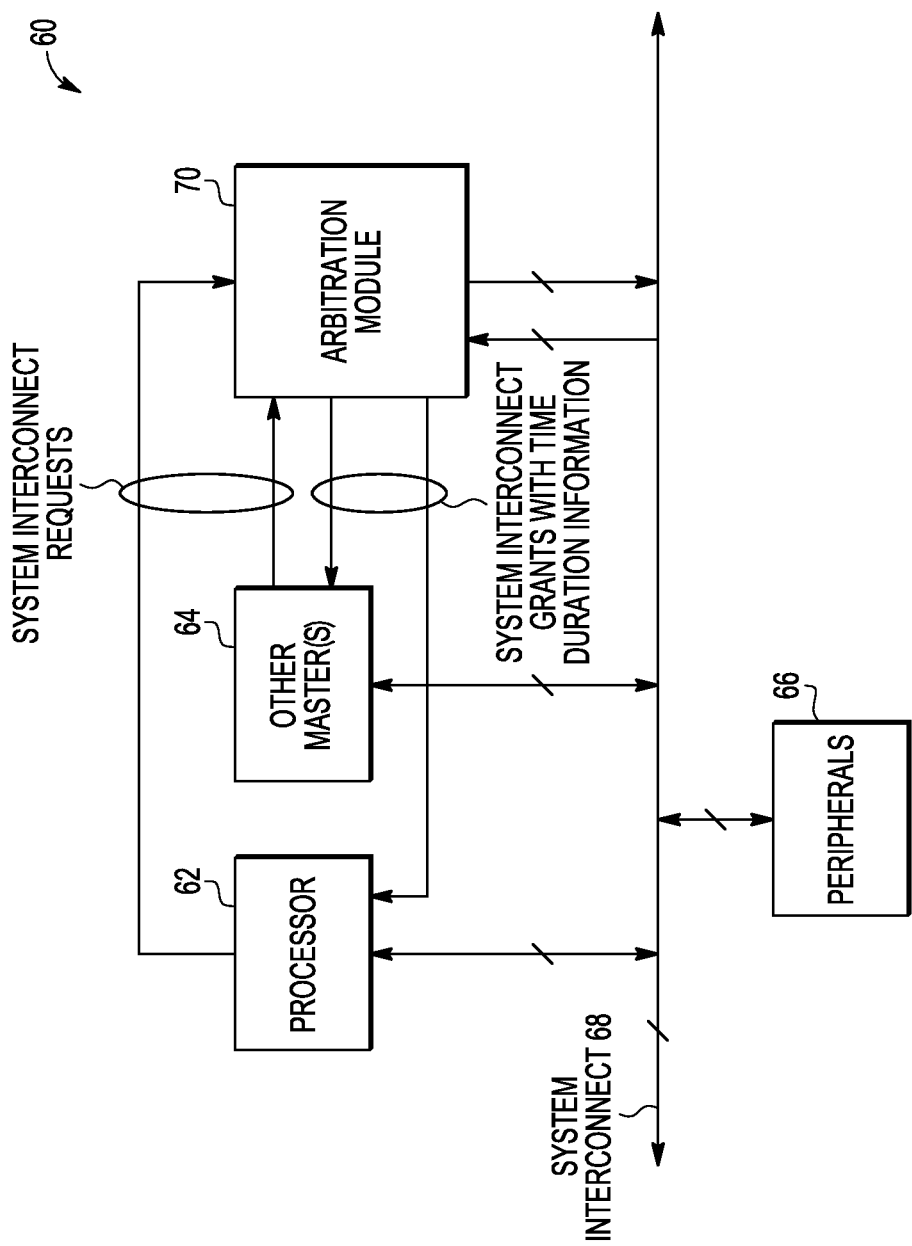
FIG. 3 illustrates, in block diagram form, a system in accordance with another embodiment of the present invention.

FIG. 3 illustrates a data processing system 60 in which an arbitration module 70 arbitrates between requests for access to a system interconnect 68. System 60 includes a system interconnect 68, a processor 62, other master(s) 64, peripherals 66, and arbitration module 70. Each of processor 62, other master(s) 64, arbitration module 70, and peripherals 66 are bidirectionally coupled to system interconnect 68, which may be a system bus or other interconnect circuitry such as a crossbar switch. Arbitration module receives requests from masters of system interconnect 68 (such as processor 62 and each of other master(s) 64) and arbitrates among the received requests. When arbitration module 70 decides to grant access in response to a particular request, it may send a system interconnect grant signal to the master which generated the particular request. The system interconnect grant signal is sent by arbitration module 70 along with time duration information. For example, each system interconnect grant signal may indicate whether it is a long grant or a short grant such that the requesting master can prioritize its transactions to know which to issue to system interconnect 68 first. In one embodiment, a short grant grants access to system interconnect 68 for a fixed time duration that is at least as long as the time required to complete a short transaction but not long enough to complete a long transaction, and a long grant grants access to system interconnect 68 for a fixed time duration that is at least as long as the time required to complete a long transaction. The grant duration can be provided on a per master basis, or may be the same for each master, such that a short grant is of the same minimum duration for all masters and the long grant is of the same minimum duration for all masters. In one embodiment, when arbitration module 70 deasserts a grant signal, then any transaction currently in progress from the requesting master on system interconnect 68 is cancelled without completion.

In alternate embodiments, the system interconnect grant signals with time duration information of FIG. 3 may provide more than just long or short information but may provide additional levels of fixed time durations, such as short, medium, long, etc. Also, arbitration module 70 may be included in processor 62 or another master such as within one of other master(s) 64. Also, in an alternate embodiment, arbitration module 70 can communicate with the requesting devices via conductors separate from system interconnect 68.

By now it should be appreciated that there has been provided a method for allowing a requesting device to improve its use of a shared resource by making improved decisions with respect to issuing transactions. For example, through the use of grant signals which contain time duration information, such as the long and short grant signals, a requesting device can reorder its transactions in a more efficient manner which may, for example, reduce the incidence of transactions being cancelled without completion upon deassertion of the grant signals. Therefore, even though a requesting device, during operation, needs to perform different transaction types, such as to access different devices having different timing requirements, the use of the grant signals with duration information allows for the requesting device to better prioritize its transactions.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Although the invention is described herein with reference to specific embodiments, various modifications and changes can be made without departing from the scope of the present invention as set forth in the claims below. For example, the short and long grant signals may be used to grant access to any type of shared resource other than a system interconnect or I/O pins. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a processing system including a shared resource; an arbitration module; and a requesting device for issuing requests to the arbitration module to access the shared resource to perform transactions on the shared resource. The arbitration module is for granting access to the requesting device to the shared resource for a fixed time duration, wherein the fixed time duration comprises one of a plurality of time durations including a first time duration and a second time duration longer than the first time duration. The requesting device prioritizes performance of the transactions on the shared resource based upon the fixed time duration and types of transactions that are to be performed, wherein a type of transaction comprises one of a plurality of types including a first type that requires a time duration that can be performed within the first time duration and a second type that requires a time duration that exceeds the first time duration but can be performed within the second time duration. Item 2 includes the processing system of item 1, wherein the processing system comprises an integrated circuit; the shared resource comprises external pins of the integrated circuit; the arbitration module is further characterized as comprising a display controller; and the requesting device comprises a memory controller. Item 3 includes the processing system of item 2, wherein the display controller performs transactions that result in the external pins being available for one of the group consisting of the first time duration and the second time duration; the second type of transaction comprises burst accesses; the memory controller executes burst accesses through the external pins during the second time durations for accessing a first type of memory; and the memory controller executes random accesses through the external pins during the first time durations and the second time durations for accessing a second type of memory. Item 4 includes the processing system of item 3, and further includes a system interconnect coupled to the memory controller. Item 5 includes the processing system of item 4, wherein the display controller comprises an LCD driver, and the system interconnect is coupled to the LCD driver. Item 6 includes the processing system of item 5, and further includes an internal memory coupled to the system interconnect. Item 7 includes the processing system of item 6, and further includes a multiplexer having a first input coupled to the LCD driver, a second input coupled to the memory controller, and an output coupled to the external pins. Item 8 includes the processing system of item 1, wherein when the arbitration module grants access to the requesting device to the shared resource for the first time duration, the requesting device prioritizes the first type of transaction over the second type of transaction, and when the arbitration module grants access to the requesting device to the shared resource for the second time duration, the requesting device prioritizes the second type of transaction over the first type of transaction. Item 9 includes the processing system of item 1, wherein the shared resource is a system interconnect. Item 10 includes the processing system of item 1, wherein the plurality of time durations further includes a third time duration longer than the second time duration.

Item 11 includes a method of operating a processing system including providing requests to perform transactions on a shared resource to an arbitration module; granting access to a master to a shared resource for a fixed time duration, wherein the fixed time duration comprises one of a group consisting of a first time duration and a second time duration longer than the first time duration; and prioritizing performance of transactions by the master using the shared resource based upon the fixed time duration and types of transactions that are to be performed, wherein a type of transaction comprises one of a plurality of types including a first type that requires a time duration that can be performed within the first time duration and a second type that requires a time duration that exceeds the first time duration but can be performed within the second time duration. Item 12 includes the method of item 11, and further includes performing display controller transactions on the shared resource to leave first and second time durations between the display controller transactions. Item 13 includes the method of item 12, wherein the performing display controller transactions comprises performing LCD driver transactions. Item 14 includes the method of item 13, wherein the transactions by the master comprise memory accesses. Item 15 includes the method of item 14, wherein the first type comprises random accesses and the second type comprises burst accesses. Item 16 includes the method of item 12, wherein the performing LCD driver transactions are performed by an LCD driver and the LCD driver performs the granting access to the master. Item 17 includes the method of item 16, wherein the providing requests to the arbitration module is performed using a system interconnect.

Item 18 includes a processing system including a display controller coupled to a shared resource for receiving requests for access to the shared resource for performing transactions and for performing display transactions on the shared resource; and a memory controller coupled to the shared resource for generating the requests for access to the shared resource for performing the transactions. The display controller is for granting access to the memory controller to the shared resource for a fixed time duration, wherein the fixed time duration comprises one of a plurality of time durations including a first time duration and a second time duration longer than the first time duration. The memory controller prioritizes performance of the transactions on the shared resource based upon the fixed time duration and types of transactions that have been requested, wherein a type of transaction comprises one of a plurality of types including a first type that requires a time duration that can be performed within the first time duration and a second type that requires a time duration that exceeds the first time duration but can be performed within the second time duration. Item 19 includes the processing system of item 18, wherein the memory controller prioritizes the second type of transaction ahead of a first type of transaction if the fixed time duration of the grant is the second time duration. Item 20 includes the processing system of item 18, wherein the shared resource is external pins of the processing system and fixed time that the display controller grants access to the external pins is based on a time between transactions performed by on the shared resource by the display controller.

What is claimed is:

1. A processing system, comprising:
   a shared resource;
   an arbitration module; and
   a requesting device for issuing requests to the arbitration module to access the shared resource to perform transactions on the shared resource;
   wherein:
   the arbitration module is for granting access to the requesting device to the shared resource for a fixed time duration, wherein the fixed time duration comprises one of a plurality of time durations including a first time duration and a second time duration longer than the first time duration; and
   the requesting device prioritizes performance of the transactions on the shared resource based upon the fixed time duration and types of transactions that are to be performed, wherein a type of transaction comprises one of a plurality of types including a first type that requires a time duration that can be performed within the first time duration and a second type that requires a time duration that exceeds the first time duration but can be performed within the second time duration.

2. The processing system of claim 1 wherein:
   the processing system comprises an integrated circuit;
   the shared resource comprises external pins of the integrated circuit;
   the arbitration module is further characterized as comprising a display controller; and
   the requesting device comprises a memory controller.

3. The processing system of claim 2, wherein:
   the display controller performs transactions that result in the external pins being available for one of the group consisting of the first time duration and the second time duration;
   the second type of transaction comprises burst accesses;
   the memory controller executes burst accesses through the external pins during the second time durations for accessing a first type of memory; and
   the memory controller executes random accesses through the external pins during the first time durations and the second time durations for accessing a second type of memory.

4. The processing system of claim 3, further comprising a system interconnect coupled to the memory controller.

5. The processing system of claim 4, wherein the display controller comprises an LCD driver, and the system interconnect is coupled to the LCD driver.

6. The processing system of claim 5, further comprising an internal memory coupled to the system interconnect.

7. The processing system of claim 6, further comprising a multiplexer having a first input coupled to the LCD driver, a second input coupled to the memory controller, and an output coupled to the external pins.

8. The processing system of claim 1, wherein when the arbitration module grants access to the requesting device to the shared resource for the first time duration, the requesting device prioritizes the first type of transaction over the second type of transaction, and when the arbitration module grants access to the requesting device to the shared resource for the second time duration, the requesting device prioritizes the second type of transaction over the first type of transaction.

9. The processing system of claim 1, wherein the shared resource is a system interconnect.

10. The processing system of claim 1, wherein the plurality of time durations further includes a third time duration longer than the second time duration.

11. A method of operating a processing system, comprising:
    providing requests to perform transactions on a shared resource to an arbitration module;
    granting access to a master to a shared resource for a fixed time duration, wherein the fixed time duration comprises one of a group consisting of a first time duration and a second time duration longer than the first time duration; and
    prioritizing performance of transactions by the master using the shared resource based upon the fixed time duration and types of transactions that are to be performed, wherein a type of transaction comprises one of a plurality of types including a first type that requires a time duration that can be performed within the first time duration and a second type that requires a time duration that exceeds the first time duration but can be performed within the second time duration.

12. The method of claim 11, further comprising performing display controller transactions on the shared resource to leave first and second time durations between the display controller transactions.

13. The method of claim 12, wherein the performing display controller transactions comprises performing LCD driver transactions.

14. The method of claim 13, wherein the transactions by the master comprise memory accesses.

15. The method of claim 14, wherein the first type comprises random accesses and the second type comprises burst accesses.

16. The method of claim 12, wherein the performing LCD driver transactions are performed by an LCD driver and the LCD driver performs the granting access to the master.

17. The method of claim 16, wherein the providing requests to the arbitration module is performed using a system interconnect.

18. A processing system, comprising:
    a display controller coupled to a shared resource for receiving requests for access to the shared resource for performing transactions and for performing display transactions on the shared resource; and
    a memory controller coupled to the shared resource for generating the requests for access to the shared resource for performing the transactions;

wherein the display controller is for granting access to the memory controller to the shared resource for a fixed time duration, wherein the fixed time duration comprises one of a plurality of time durations including a first time duration and a second time duration longer than the first time duration; and wherein the memory controller prioritizes performance of the transactions on the shared resource based upon the fixed time duration and types of transactions that have been requested, wherein a type of transaction comprises one of a plurality of types including a first type that requires a time duration that can be performed within the first time duration and a second type that requires a time duration that exceeds the first time duration but can be performed within the second time duration.

19. The processing system of claim 18, wherein the memory controller prioritizes the second type of transaction ahead of a first type of transaction if the fixed time duration of the grant is the second time duration.

20. The processing system of claim 18, wherein the shared resource is external pins of the processing system and fixed time that the display controller grants access to the external pins is based on a time between transactions performed by on the shared resource by the display controller.

* * * * *